United States Patent
Kim et al.

(10) Patent No.: US 8,027,397 B2
(45) Date of Patent: Sep. 27, 2011

(54) APPARATUS FOR CREATING, DEMODULATING, TRANSMITTING AND RECEIVING ORTHOGONAL FREQUENCY DIVISION MULTIPLEXING SYMBOL

(75) Inventors: Nam-Il Kim, Daejeon (KR);
Young-Hoon Kim, Daejeon (KR);
Seung-Chan Bang, Daejeon (KR)

(73) Assignees: Electronics and Telecommunications Research Institute, Daejeon (KR); SK Telecom., Co., Ltd., Seoul (KR); KT Corporation, Seongnam (KR)

( * ) Notice: Subject to any disclaimer, the term of this patent is extended or adjusted under 35 U.S.C. 154(b) by 723 days.

(21) Appl. No.: 12/090,201

(22) PCT Filed: Oct. 10, 2006

(86) PCT No.: PCT/KR2006/004065
§ 371 (c)(1),
(2), (4) Date: Apr. 14, 2008

(87) PCT Pub. No.: WO2007/043789
PCT Pub. Date: Apr. 19, 2007

(65) Prior Publication Data
US 2008/0260055 A1    Oct. 23, 2008

(30) Foreign Application Priority Data

Oct. 12, 2005  (KR) .................. 10-2005-0095994
Sep. 21, 2006  (KR) .................. 10-2006-0091571

(51) Int. Cl.
*H04L 27/28* (2006.01)
(52) U.S. Cl. ........ 375/260; 375/267; 375/299; 375/340;
375/347; 455/101; 455/132; 455/296; 455/500;
455/562.1; 370/203; 370/204; 370/206; 370/208;
370/210; 370/480

(58) Field of Classification Search .................. 375/260,
375/267, 299, 340, 347; 455/101, 132, 296,
455/500, 562.1; 370/203, 204, 206, 208,
370/210, 480
See application file for complete search history.

(56) References Cited

U.S. PATENT DOCUMENTS

| 5,956,318 | A  | * | 9/1999  | Saeki ............................ 370/206 |
| 6,940,828 | B2 | * | 9/2005  | Mandyam ..................... 370/281 |
| 7,526,044 | B2 | * | 4/2009  | Koga et al. .................... 375/295 |
| 7,620,112 | B2 | * | 11/2009 | Tang et al. .................... 375/260 |
| 2003/0142754 | A1 |   | 7/2003  | Jung et al. |
| 2003/0169683 | A1 | * | 9/2003  | Mendlovic et al. ........... 370/208 |

(Continued)

OTHER PUBLICATIONS

International Search Report for PCT/KR2006/004065 dated Jan. 22, 2007.

(Continued)

*Primary Examiner* — Leon Flores
(74) *Attorney, Agent, or Firm* — Kile Park Goekjian Reed & McManus PLLC

(57) ABSTRACT

The present invention relates to an orthogonal frequency division multiplexing (OFDM) signal transmitting and receiving device, in which a peak to average power ratio characteristic is improved without reducing a data transmission speed. The OFDM signal transmitting device separates a digital modulated symbol as a real part and an imaginary part, and performs discrete cosine transform (DCT) and discrete sine transform (DST) operations respectively for real and imaginary part symbols, performs an inverse fast Fourier transform operation, and generates an OFDM symbol. The OFDM signal receiving device performs a fast Fourier transform operation for the OFDM symbol, and performs an inverse DCT operation and an inverse DST operation, performs a digital demodulating operation, and generates a final binary data symbol.

8 Claims, 9 Drawing Sheets

U.S. PATENT DOCUMENTS

2004/0125880 A1     7/2004    Shahriar et al.
2004/0136314 A1     7/2004    Jung et al.
2008/0316912 A1*   12/2008   Al Adnani .................... 370/210

OTHER PUBLICATIONS

Written Opinion for PCT/KR2006/004065 dated Jan. 22, 2007.

K. Sathananthan et al., "Adaptive Transform Scheme to Reduce Par of an OFDM Signal", IEEE 2004, pp. 1722-1725.

A. E. Jones et al., "Block coding scheme for reducing of peak to mean envelope power ratio of multicarrier transmission schemes", Electronics Letters, Dec. 8, 1994, vol. 30, No. 25, pp. 2098-2099.

* cited by examiner

APPARATUS FOR CREATING, DEMODULATING, TRANSMITTING AND RECEIVING ORTHOGONAL FREQUENCY DIVISION MULTIPLEXING SYMBOL

TECHNICAL FIELD

The present invention relates to an orthogonal frequency division multiplexing (OFDM) symbol generator, an OFDM symbol transmitting device, and an OFDM symbol receiving device. Particularly, the present invention relates to a device for generating an OFDM symbol having an improved peak to average power ratio (PAPR) without reducing a data transmission speed, and transmitting and receiving the OFDM symbol.

BACKGROUND ART

Since a paradigm of a wireless communication service has been changed from a voice service to a multimedia service, the orthogonal frequency division multiplexing (OFDM) scheme and the orthogonal frequency division multiplexing access (OFDMA) scheme using the OFDM scheme has received a great deal of attention. Since the OFDM scheme has a good bandwidth-efficiency and characteristics that are robust against multipath fading, it is widely used in a fourth generation mobile communication system, a digital multimedia broadcasting TV, and a wireless local area network (WLAN).

A signal transmitting device and a signal receiving device in a conventional OFDM scheme will be described with reference to FIG. 1.

FIG. 1 shows a block diagram of a signal transmitting device 10 and a signal receiving device 20 in the conventional OFDM scheme.

As shown in FIG. 1, the signal transmitting device 10 in the conventional OFDM scheme includes a digital modulating unit 11, a serial to parallel converter (SPC) 12, an inverse fast Fourier transform (IFFT) unit 13, a parallel to serial converter (PSC) 14, a cyclic prefix (CP) adder 15, a digital to analog converter (DAC) 16, a transmitting unit 17, and a transmitting antenna 18.

The digital modulating unit 11 performs digital modulating operations including binary phase shift keying (BPSK), quadrature amplitude modulation (QAM), 16-QAM, and 64-QAM for a data symbol that is binary data to be transmitted to a channel, and generates a digital-modulated symbol. The digital modulating unit 11 may be referred to as a "symbol mapping unit".

The SPC 12 serially receives a plurality of digital-modulated symbols from the digital modulating unit 11 and outputs them in parallel.

The IFFT unit 13 performs an IFFT operation for the plurality of parallel digital-modulated symbols output from the SPC 12, and generates a plurality of IFFT symbols.

The PSC 14 serially outputs the plurality of parallel IFFT symbols output from the IFFT unit 13.

The CP adder 15 adds a signal, which is referred as a cyclic prefix, to a former part of the plurality of serial IFFT symbols, which is output from the PSC 14, and generates a symbol group including the CP signal. Here, the CP is a part of symbols in a latter part of the plurality of IFFT symbols.

The DAC 16 receives the symbol group including the CP from the CP adder 15, and converts the symbol group into one analog OFDM symbol.

The transmitting unit 17 amplifies the generated OFDM symbol to a radio frequency (RF) signal, and transmits the RF signal to a channel through the transmitting antenna 18.

As shown in FIG. 1, the signal receiving device 20 in the conventional OFDM scheme includes a receiving antenna 21, a receiving unit 22, an analog to digital converter (ADC) 23, a cyclic prefix (CP) eliminating unit 24, an SPC 25, a fast Fourier transform (FFT) unit 26, a PSC 27, and a digital demodulating unit 28.

The receiving unit 22 receives the OFDM symbol from the channel through the receiving antenna 21.

The ADC 23 converts the OFDM symbol into a plurality of digital symbols.

The CP eliminating unit 24 eliminates the CP from the plurality of digital symbols.

The SPC 25 serially receives the plurality of CP-eliminated digital symbols, and outputs them in parallel.

The FFT unit 26 receives the plurality of parallel symbols from the SPC 25, performs a fast Fourier transform (FFT) operation, and generates a plurality of frequency domain symbols.

The PSC 27 receives the plurality of symbols from the FFT unit 26 in parallel, and serially outputs them.

The digital demodulating unit 28 digitally demodulates the plurality of symbols serially output from the PSC 27, and generates a final data symbol.

The above OFDM symbol problematically has a large peak to average power ratio (PAPR). A signal is distorted in the OFDM symbol having the large PAPR while it is amplified by nonlinear devices including a high power amplifier (HPF).

Accordingly, various studies have been ongoing to improve the PAPR characteristic. However, since a part of subcarriers are used to improve the PAPR in suggested methods, the data transmission speed is reduced.

DISCLOSURE

Technical Problem

The present invention has been made in an effort to provide a orthogonal frequency division multiplexing (OFDM) symbol generating device, an OFDM symbol transmitting device, and an OFDM symbol receiving device, in which a peak to average power ratio (PAPR) is improved without reducing a data transmission speed.

Technical Solution

An exemplary device for generating an orthogonal frequency division multiplexing (OFDM) symbol includes a complex number separating unit, a discrete cosine transform (DCT) unit, a discrete sine transform (DST) unit, a complex number combining unit, an inverse fast Fourier transform (IFFT) unit, and an analog converter. The complex number separating unit separates a plurality of digital-modulated symbols as a real part symbol group and an imaginary part symbol group. The DCT unit performs a DCT operation of the real part symbol group, and generates a DCT symbol group. The DST unit performs a DST operation for the imaginary part symbol group, and generates a DST symbol group. The complex number combining unit combines the DCT symbol group and the DST symbol group, and outputs a complex symbol group. The IFFT unit performs an IFFT operation for the complex symbol group, and generates an IFFT symbol group. The analog converter converts the IFFT symbol group into an analog signal, and generates the OFDM symbol.

An exemplary device for generating an orthogonal frequency division multiplexing (OFDM) symbol includes a complex number separating unit, a discrete cosine transform (DCT) unit, a discrete sine transform (DST) unit, a complex number combining unit, an inverse fast Fourier transform (IFFT) unit, and an analog converter. The complex number separating unit separates a plurality of digital-modulated symbols as a real part symbol group and an imaginary part symbol group. The DCT unit performs a DCT operation for the imaginary part symbol group, and generates a DCT symbol group. The DST unit performs a DST operation for the real part symbol group, and generates a DST symbol group. The complex number combining unit combines the DCT symbol group and the DST symbol group, and outputs a complex symbol group. The IFFT unit for performs an IFFT operation for the complex symbol group, and generates an IFFT symbol group. The analog converter converts the IFFT symbol group into an analog signal, and generates the OFDM symbol.

An exemplary device for demodulating an orthogonal frequency division multiplexing (OFDM) symbol and generating a data symbol includes a digital converter, a fast Fourier transform (FFT) unit, a complex number separating unit, an inverse discrete cosine transform (IDCT) unit, an inverse discrete sine transform (IDST) unit, a complex number combining unit, and a digital demodulating unit. The digital converter converts the OFDM symbol into a digital signal, and generates a digital symbol group. The FFT unit performs an FFT operation for the digital symbol group, and generates an FFT symbol group. The complex number separating unit separates the FFT symbol group as a real part and an imaginary part, and outputs a real part symbol group and an imaginary part symbol group. The IDCT unit performs an IDCT operation for the real part symbol group, and generates an IDCT symbol group. The IDST unit performs an IDST operation for the imaginary part symbol group, and generates an IDST symbol group. The complex number combining unit combines the IDCT symbol group and the IDST symbol group, and generates a complex symbol group. The digital demodulating unit digitally demodulates the complex symbol group, and generates the data symbol.

An exemplary device for demodulating an orthogonal frequency division multiplexing (OFDM) symbol and generating a data symbol includes a digital converter, a fast Fourier transform (FFT) unit, a complex number separating unit, an inverse discrete cosine transform (IDCT) unit, an inverse discrete sine transform (IDST) unit, a complex number combining unit, and a digital demodulating unit. The digital converter converts the OFDM symbol into a digital signal, and generates a digital symbol group. The FFT unit performs an FFT operation for the digital symbol group, and generates an FFT symbol group. The complex number separating unit separates the FFT symbol group as a real part and an imaginary part, and outputs a real part symbol group and an imaginary part symbol group. The IDCT unit performs IDCT operation for the imaginary part symbol group, and generates an IDCT symbol group. The IDST unit performs an IDST operation for the real part symbol group and generates an IDST symbol group. The complex number combining unit combines the IDCT symbol group and the IDST symbol group, and outputs a complex symbol group. The digital demodulating unit digitally demodulates the complex symbol group, and generates the data symbol.

An exemplary signal transmitting device for transmitting a binary data symbol to a channel includes a plurality of antennas corresponding to a plurality of space areas, a digital modulating unit, a space encoder, a plurality of complex number separating units, a plurality of discrete cosine transform (DCT) units, a plurality of discrete sine transform (DST) units, a plurality of complex number combining units, a plurality of inverse fast Fourier transform (IFFT) units, an analog converter, and a plurality of transmitting units. The digital modulating unit digitally modulates the binary data symbol, and generates a digital-modulated symbol. The space encoder receives the digital-modulated symbol, performs a space encoding operation for the plurality of space areas, and generates a plurality of space encoded symbols respectively corresponding to the plurality of space areas. The plurality of complex number separating units respectively correspond to the plurality of space areas, receive the plurality of space encoded symbols corresponding to the corresponding space area, separate the received space encoded symbols as a real part and an imaginary part, and output a real part symbol group and an imaginary part symbol group. The plurality of DCT units respectively correspond to the plurality of space areas, perform a DCT operation for the real part symbol group output from the complex number separating unit corresponding to the corresponding space area, and generate a DCT symbol group. The DST units respectively correspond to the plurality of space areas, perform a DST operation for the imaginary part symbol group output from the complex number separating unit corresponding to the corresponding space area, and generate a DST symbol group. The plurality of complex number combining units respectively correspond to the plurality of space areas, combine the DCT symbol group output from the DCT unit corresponding to a corresponding space area and the DST symbol group output from the corresponding DST unit, and generate a complex symbol group. The plurality of IFFT units respectively correspond to the plurality of space areas, perform an IFFT operation for the complex symbol group output from the complex number combining unit corresponding to the corresponding space area, and generate an IFFT symbol group. The analog converter respectively corresponds to the plurality of space areas, converts the IFFT symbol group, which is output from the IFFT unit corresponding to the corresponding space area, into an analog signal, and generates an orthogonal frequency division multiplexing (OFDM) symbol. The plurality of transmitting units respectively correspond to the plurality of space areas, and transmit the OFDM symbol, which is output from the analog converter corresponding to the corresponding space area, to the channel through the antenna corresponding to the corresponding space area.

An exemplary signal transmitting device for transmitting a binary data symbol to a channel includes a plurality of antennas respectively corresponding to a plurality of space areas, a digital modulating unit, a space encoder, a plurality of complex number separating units, a plurality of discrete cosine transform (DCT) units, a plurality of discrete sine transform (DST) units, a plurality of complex number combining units, a plurality of inverse fast Fourier transform (IFFT) units, a plurality of analog converters, and a plurality of transmitting units. The digital modulating unit digitally modulates the binary data symbol, and generates a digital-modulated symbol. The space encoder receives the digital-modulated symbol, performs a space encoding operation for the plurality of space areas, and generates a plurality of space encoded symbols respectively corresponding to the plurality of space areas. The plurality of complex number separating units respectively correspond to the plurality of space areas, receive the plurality of space encoded symbols corresponding to the corresponding space area, separate the space encoded symbols as a real part and an imaginary part, and output a real part symbol group and an imaginary part symbol group. The plurality of DCT units respectively correspond to the plurality of space areas, perform a DCT operation for the imaginary part symbol group output from the complex number separating unit corresponding to the corresponding space area, and generate a DCT symbol group. The plurality of DST units respectively correspond to the plurality of space areas, perform a DST operation for the real part symbol group output from the complex number separating unit corresponding to the corresponding space area, and generate a DST symbol group. The plurality of complex number combining units respectively correspond to the plurality of space areas, combine the DCT symbol group output from the DCT unit corresponding to the corresponding space area and the DST symbol group output from the corresponding DST unit, and output a complex symbol group. The plurality of IFFT units respectively correspond to the plurality of space areas, perform an IFFT operation for the complex symbol group output from the complex number combining unit corresponding to the corresponding space area, and generate an IFFT symbol group. The plurality of analog converters respectively correspond to the plurality of space areas, convert the IFFT symbol group, which is output from the IFFT unit corresponding to the corresponding space area, into an analog signal, and generate an orthogonal frequency division multiplexing (OFDM) symbol. The plurality of transmitting units respectively correspond to the plurality of space areas, and transmit the OFDM symbol, which is output from the analog converter corresponding to the corresponding space area, to the channel through the antenna corresponding to the corresponding space.

An exemplary signal receiving device for receiving a binary data symbol includes a plurality of antennas respectively corresponding to a plurality of space areas, a plurality of receiving units, a plurality of digital converters, a plurality of fast Fourier transform (FFT) units, a plurality of complex number separating units, a plurality of inverse discrete cosine transform (IDCT) units, a plurality of inverse discrete sine transform (IDST) units, a plurality of complex number combining units, a space decoder, and a digital demodulating unit. The plurality of receiving units respectively correspond to the plurality of space areas, and receive orthogonal frequency division multiplexing (OFDM) symbols through the antenna corresponding to the corresponding space area. The plurality of digital converters respectively correspond to the plurality of space areas, convert the OFDM symbol, which is output from the receiving unit corresponding to the corresponding space area, into a digital signal, and generate a digital symbol group. The plurality of FFT units respectively correspond to the plurality of space areas perform an FFT operation for the digital symbol group output from the digital converter corresponding to the corresponding space area, and generate an FFT symbol group. The plurality of complex number separating units respectively correspond to the plurality of space areas, receive the FFT symbol group from the FFT unit corresponding to the corresponding space area, separate the FFT symbol group as a real part and an imaginary part, and output a real part symbol group and an imaginary part symbol group. The plurality of IDCT units respectively correspond to the plurality of space areas, perform an IDCT operation for the real part symbol group output from the complex number separating unit corresponding to the corresponding space area, and generate an IDCT symbol group. The plurality of IDST units respectively correspond to the plurality of space areas, perform an IDST operation for the imaginary part symbol group output from the complex number separating unit corresponding to the corresponding space area, and generate an IDST symbol group. The plurality of complex number combining units respectively correspond to the plurality of space areas, combine the IDCT symbol group output from the IDCT unit corresponding to the corresponding space area and the IDST symbol group output from the corresponding IDST unit, and output a complex symbol group. The space decoder receives the complex symbol group from the plurality of complex number combining units, performs a space decoding operation for the plurality of space areas, and generates a space decoded symbol group. The digital demodulating unit digitally demodulates the space decoded symbol group, and generates the binary data symbol.

An exemplary signal receiving device for receiving a binary data symbol includes a plurality of antennas respectively corresponding to a plurality of space areas, a plurality of receiving units, a plurality of digital converters, a plurality of fast Fourier transform (FFT) units, a plurality of complex number separating units, a plurality of inverse discrete cosine transform (IDCT) units, a plurality of inverse discrete sine transform (IDST) unit, a space decoder, and a digital demodulating unit. The plurality of receiving units respectively correspond to the plurality of space areas, and receive orthogonal frequency division multiplexing (OFDM) symbols through the antenna corresponding to the corresponding space area. The plurality of digital converters respectively correspond to the plurality of space areas, convert the OFDM symbol, which is output from the receiving unit corresponding to the corresponding space area, into a digital signal, and generate a digital symbol group. The plurality of FFT units respectively correspond to the plurality of space areas, perform an FFT operation for the digital symbol group output from the digital converter corresponding to the corresponding space area, and generate an FFT symbol group. The plurality of complex number separating units respectively correspond to the plurality of space areas, receive the FFT symbol group from the FFT unit corresponding to the corresponding space area, separate the FFT symbol group as a real part and an imaginary part, and output a real part symbol group and an imaginary part symbol group. The plurality of IDCT units respectively correspond to the plurality of space areas, perform an IDCT operation for the imaginary part symbol group output from the complex number separating unit corresponding to the corresponding space area, and generate an IDCT symbol group. The plurality of IDST units respectively correspond to the plurality of space areas, perform an IDST operation for the real part symbol group output from the complex number separating unit corresponding to the corresponding space area, and generate an IDST symbol group. The plurality of complex number combining units respectively correspond to the plurality of space areas, combine the IDCT symbol group output from the IDCT unit corresponding to the corresponding space area and the IDST symbol group output from the corresponding IDST unit, and output a complex symbol group. The space decoder receives the complex symbol group from the plurality of complex number combining units, performs a space decoding operation for the plurality of space areas, and generates a space decoded symbol group. The digital demodulating unit digitally demodulates the space decoded symbol group, and generates the binary data symbol.

Advantageous Effects

According to the exemplary embodiment of the present invention, since the OFDM signal transmitting device generates the OFDM symbol by performing the DCT and DST operations before performing the IFFT operation, the PAPR may be improved without using additional subcarriers.

BEST MODE

Figure 1:
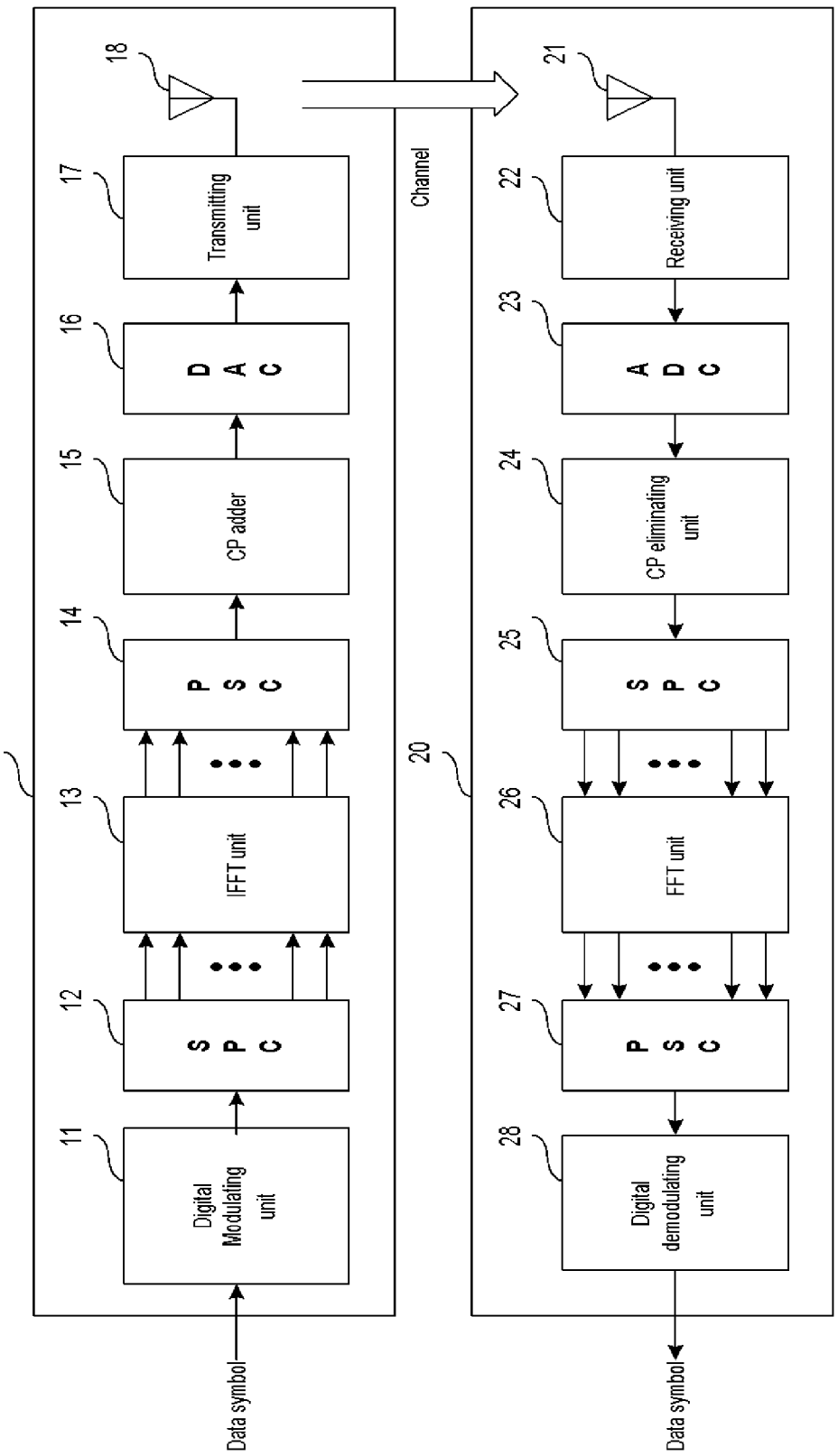
FIG. 1 shows a block diagram of a signal transmitting device and a signal receiving device in a conventional orthogonal frequency division multiplexing (OFDM) scheme.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise", and variations such as "comprises" or "comprising", will be understood to imply the inclusion of stated elements but not the exclusion of any other elements.

An orthogonal frequency division multiplexing (OFDM) signal transmitting device 100 according to an exemplary embodiment of the present invention will be described with reference to FIG. 2.

Figure 2:
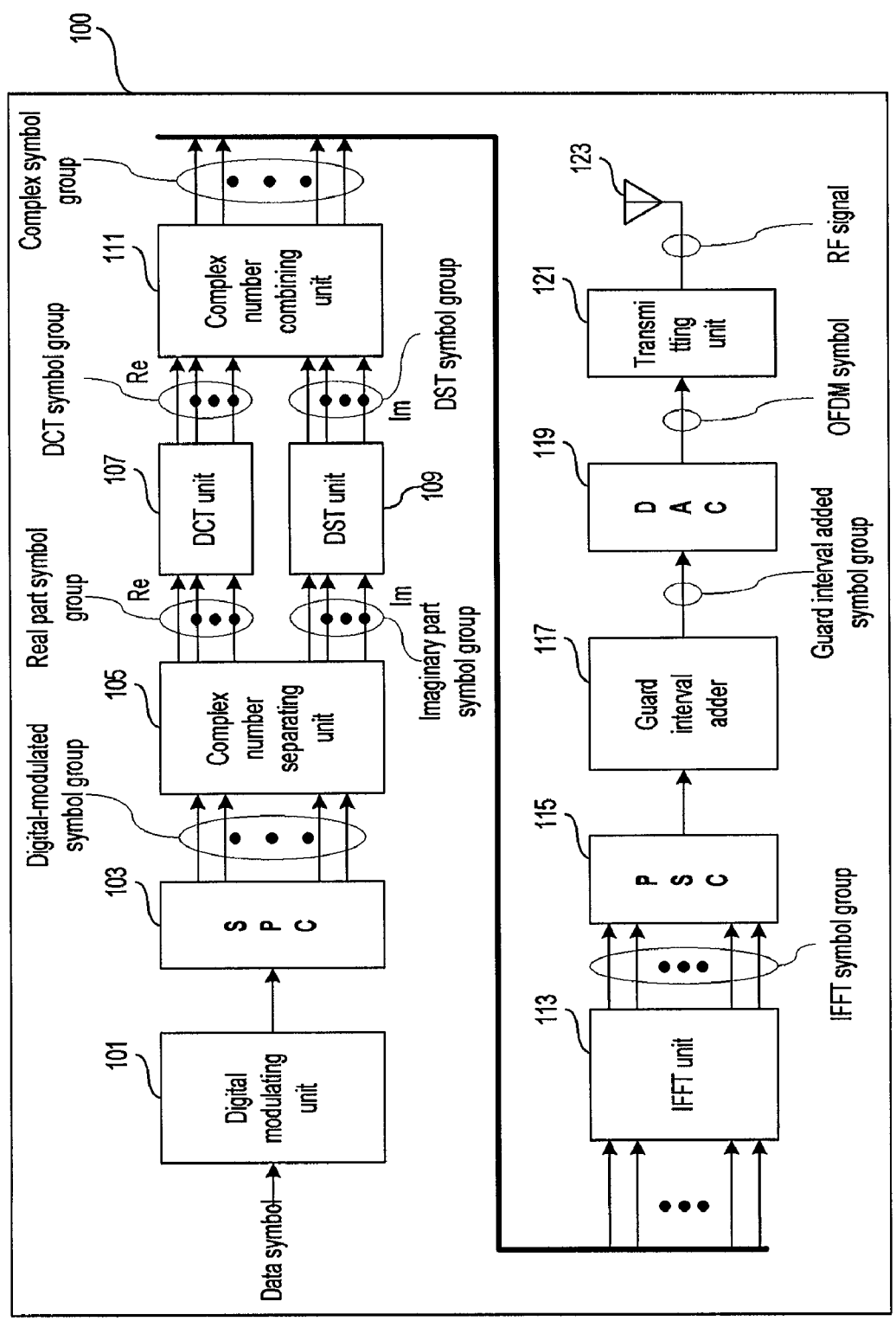
FIG. 2 shows a block diagram representing an OFDM signal transmitting device according to an exemplary embodiment of the present invention.

FIG. 2 shows a block diagram representing the OFDM signal transmitting device 100 according to the exemplary embodiment of the present invention.

As shown in FIG. 2, the OFDM signal transmitting device 100 according to the exemplary embodiment of the present invention includes a digital modulating unit 101, a serial to parallel converter (SPC) 103, a complex number separating unit 105, a discrete cosine transform (DCT) unit 107, a discrete sine transform (DST) unit 109, a complex number combining unit 111, an inverse fast Fourier transform (IFFT) unit 113, a parallel to serial converter (PSC) 115, a guard interval adder 117, a digital-analog converter (DAC) 119, a transmitting unit 121, and a transmitting antenna 123.

The digital modulating unit 101 performs digital modulating operations including binary phase shift keying (BPSK), quadrature amplitude modulation (QAM), 16-QAM, and 64-QAM for a data symbol that is binary data to be transmitted to a channel.

The SPC 103 serially receives M digital-modulated symbols from the digital modulating unit 111, and outputs them in parallel. Hereinafter, the M digital-modulated symbols output from the SPC 103 in parallel will be referred to as a digital-modulated symbol group. The digital-modulated symbol group may be given as Equation 1.

$$\{X(0), X(1), \ldots, X(M-1)\} \quad \text{[Equation 1]}$$

The complex number separating unit 105 receives the digital-modulated symbol group from the SPC 103, separates it as a real part and an imaginary part, and outputs M real part symbols and M imaginary part symbols. Hereinafter, the M real part symbols and the M imaginary part symbols output from the complex number separating unit 105 will be respectively referred to as a real part symbol group and an imaginary part symbol group. The real part symbol group and the imaginary part symbol group may be respectively given as Equation 2 and Equation 3.

$$\{X_R(0), X_R(1), \ldots, X_R(M-1)\} = \quad \text{[Equation 2]}$$
$$\{\text{Re}(X(0)), \text{Re}(X(1)), \ldots, \text{Re}(X(M-1))\}$$

$$\{X_I(0), X_I(1), \ldots, X_I(M-1)\} = \quad \text{[Equation 3]}$$
$$\{\text{Im}(X(0)), \text{Im}(X(1)), \ldots, \text{Im}(X(M-1))\}$$

The DCT unit 107 receives the real part symbol group from the complex number separating unit 105, performs a DCT operation, and generates M discrete cosine transformed symbols. A function performed by the DCT unit 107 is given as Equation 4.

$$X_{DCT}(k) = \alpha(k) \sum_{m=0}^{M-1} X_R(m) \cdot \cos\left(\frac{\pi(2m+1)k}{2M}\right) \quad \text{[Equation 4]}$$

where $$k = 0, 1, \ldots, M-1$$

$$\alpha(0) = \sqrt{\frac{1}{M}}, \alpha(k) = \sqrt{\frac{2}{M}} \ (1 \leq k \leq M-1)$$

Hereinafter, the M discrete cosine transformed symbols generated by the DCT unit 107 will be referred to as a DCT symbol group. The DCT symbol group may be given as Equation 5.

$$\{X_{DCT}(0), X_{DCT}(1), \ldots, X_{DCT}(M-1)\} \quad \text{[Equation 5]}$$

The DST unit 109 receives the imaginary part symbol group from the complex number separating unit 105, performs a DST operation, and generates M discrete sine transformed symbols. A function performed by the DST unit 109 may be given as Equation 6.

$$X_{DST}(k) = \alpha(k) \sum_{m=0}^{M-1} X_I(m) \sin \cdot \left( \frac{\pi(2m+1)k}{2M} \right)$$ [Equation 6]

where $k = 0, 1, \ldots, M-1$ $\alpha(0) = \sqrt{\frac{1}{M}}, \alpha(k) = \sqrt{\frac{2}{M}} \ (1 \leq k \leq M-1)$ Hereinafter, the M discrete sine transformed symbols generated by the DST unit 109 will be referred to as a DST symbol group. The DST symbol group may be given as Equation 7.

$\{X_{DST}(0), X_{DST}(1), \ldots, X_{DST}(M-1)\}$ [Equation 7]

Referring to FIG. 2, the DCT unit 107 performs the DCT operation for the real part symbol group output from the complex number separating unit 105, and the DST unit 109 performs the DST operation for the imaginary part symbol group output from the complex number separating unit 105. However, according to another exemplary embodiment of the present invention, the DCT unit 107 may perform the DCT operation for the imaginary part symbol group output from the complex number separating unit 105, and the DST unit 109 may perform the DST operation for the real part symbol group output from the complex number separating unit 105.

The complex number combining unit 111 combines the DCT symbol group that is an output of the DCT unit 107 and the DST symbol group that is an output of the DST unit 109 to generate M complex number symbols. The M complex number symbols generated by the complex number combining unit 111 will be referred to as a complex symbol group. The complex symbol group may be given as Equation 8.

$\{Z(0), Z(1), \ldots, Z(M-1)\} = \{X_{DCT}(0) + jX_{DST}(0),$ [Equation 8]

$X_{DCT}(1) + jX_{DST}(1), \ldots, X_{DCT}(M-1) + jX_{DST}(M-1)\}$

In addition, the complex symbol group may be given as Equation 9.

$\{Z(0), Z(1), \ldots, Z(M-1)\} = \{X_{DST}(0) + jX_{DCT}(0),$ [Equation 9]

$X_{DST}(1) + jX_{DCT}(1), \ldots, X_{DST}(M-1) + jX_{DCT}(M-1)\}$

The IFFT unit 113 receives the complex symbol group from the complex number combining unit 111, and performs an inverse fast Fourier transform operation. When assuming that the IFFT unit 113 is an N-point IFFT operator (in this case, N is equal to or higher than M), the IFFT unit 113 uses the M complex number symbols output from the complex number combining unit 111 and (N−M) null symbols (i.e., 0 symbols) to generate N time domain IFFT symbols. An operation of the IFFT unit 113 according to the exemplary embodiment of the present invention may be given as Equation 10.

$$X_T(n) = \frac{1}{N} \sum_{k=0}^{N-1} X_F(k) \cdot e^{\frac{j2\pi kn}{N}}$$ [Equation 10]

$(n = 0, 1, \ldots, N-1)$

Input symbols XF(0) to XF(N−1) of the IFFT unit 113 are frequency domain symbols, which may be given as Equation 11.

$\{X_F(0), X_F(1), \ldots, X_F(N-1)\} =$ [Equation 11]

$\{Z(0), Z(1), \ldots, Z(M-1), 0, 0, \ldots, 0\}$

Referring to Equation 11, the input symbols XF(0) to XF(N−1) of the IFFT unit 113 have a 1:1 relationship with the M complex number symbols generated by the complex number combining unit 111 and the (N−M) null symbols. In this case, XF(0) and other symbols do not necessarily have to correspond to Z(0).

In addition, the N IFFT symbols generated by the IFFT unit 113 will be referred to as an IFFT symbol group. The IFFT symbol group may be given as Equation 12.

$\{X_T(0), X_T(1), \ldots, X_T(N-1)\}$ [Equation 12]

The PSC 115 serially outputs the N parallel IFFT symbols.

The guard interval adder 117 adds a guard interval to the IFFT symbol group serially output from the PSC 115, so as to prevent inter-symbol interference (ISI). A cyclic prefix (CP) is an example of the guard interval. An output of the guard interval adder 117 when adding the CP to the IFFT symbol group may be given as Equation 13.

$\left\{ \underbrace{X_T(N-a), \ldots, X_T(N-1)}_{\text{Cyclic Prefix}}, X_T(0), X_T(1), \ldots, X_T(N-1) \right\}$ [Equation 13]

Referring to Equation 13, the CP is a-numbered symbols in a latter part of the IFFT symbol group. Accordingly, the guard interval adder 117 adds some symbols in the latter part of the IFFT symbol group to a former part of the IFFT symbol group to generate a symbol group to which the guard interval is added (hereinafter referred to as a "guard interval added symbol group").

The DAC 119 receives the guard interval added symbol group from the guard interval adder 117 and converts it into an analog signal. The analog signal output from the DAC 119 is an OFDM symbol.

The transmitting unit 121 amplifies the OFDM symbol to a RF signal, and transmits it to a channel through the transmitting antenna 123.

An OFDM signal receiving device 200 according to the exemplary embodiment of the present invention will be described with reference to FIG. 3.

Figure 3:
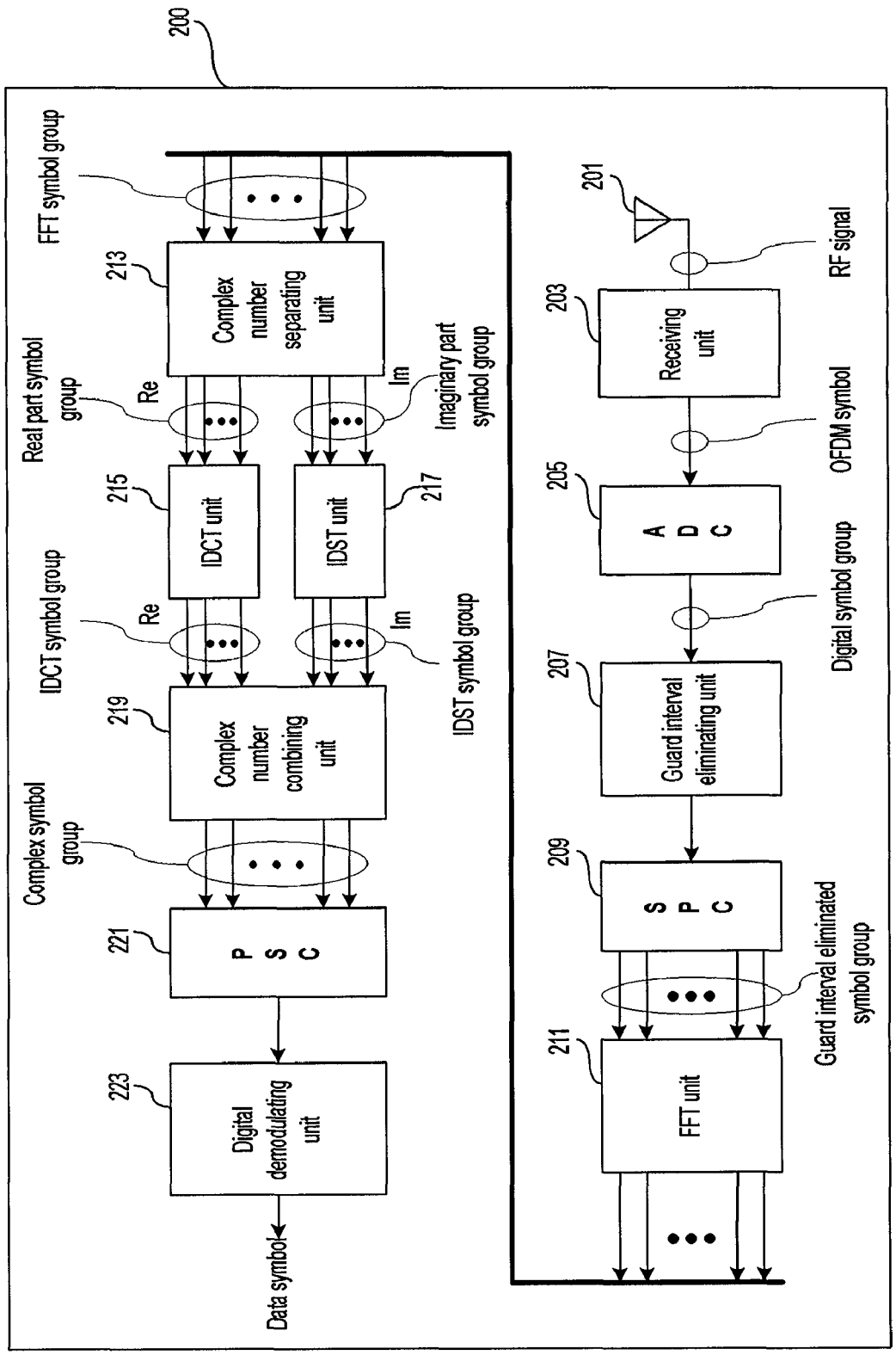
FIG. 3 shows a block diagram representing an OFDM signal receiving device according to the exemplary embodiment of the present invention.

FIG. 3 shows a block diagram representing the OFDM signal receiving device 200 according to the exemplary embodiment of the present invention.

As shown in FIG. 3, the OFDM signal receiving device 200 according to the exemplary embodiment of the present invention receives the OFDM symbol from the signal transmitting device 100 shown in FIG. 2. In addition, the OFDM signal receiving device 200 includes a receiving antenna 201, a receiving unit 203, an analog to digital converter (ADC) 205, a guard interval eliminating unit 207, a serial to parallel converter (SPC) 209, a fast Fourier transform (FFT) unit 211, a complex number separating unit 213, an inverse discrete cosine transform (IDCT) unit 215, an inverse discrete sine transform (IDST) unit 217, a complex number combining unit 219, a parallel to serial converter (PSC) 221, and a digital demodulating unit 223.

The receiving unit 203 receives the RF signal from the OFDM signal transmitting device 100 through the receiving antenna 201, and outputs the OFDM symbol.

The ADC 205 converts the OFDM symbol that is an analog signal into a digital signal, and generates (N+a) digital symbols including a-numbered symbols corresponding to the guard interval symbol. The (N+a) digital symbols generated by the ADC 205 will be referred to as a digital symbol group. The digital symbol group may be given as Equation 13.

The guard interval eliminating unit 207 eliminates the a numbered symbols corresponding to the guard interval symbol from the digital symbol group output by the ADC 205, and outputs N symbols to which the guard interval is eliminated. The N symbols generated by the guard interval eliminating unit 207 will be referred to as a guard interval eliminated symbol group. The guard interval eliminated symbol group may be given as Equation 12.

The SPC 209 outputs the serially input guard interval eliminated symbol group in parallel.

The FFT unit 211 performs an FFT operation for the parallel guard interval eliminated symbol group, and generates N FFT symbols. An operation of the FFT unit 211 may be given as Equation 14.

$$X_F(k) = \sum_{k=0}^{N-1} X_T(n) \cdot e^{-\frac{j2\pi k n}{N}} \quad \text{[Equation 14]}$$
$$(k = 0, 1, \ldots, N-1)$$

The N FFT symbols generated by the FFT unit 211 will be referred to as an FFT symbol group, and the FFT symbol group may be given as Equation 15.

$$\{X_F(0), X_F(1), \ldots, X_F(N-1)\} \quad \text{[Equation 15]}$$

The complex number separating unit 213 separates M signals, which have no null value among the FFT symbol group generated by the FFT unit 211, as real and imaginary parts, and outputs M real part symbols and M imaginary part symbols. The M real part symbols and the M imaginary part symbols output from the complex number separating unit 213 will be respectively referred to as a real part symbol group and an imaginary part symbol group. When the M signals, which have no null value among the FFT symbol group, are given as Equation 16, the real part symbol group and the imaginary part symbol group may be respectively given as Equation 17 and Equation 18.

$$\{Z(0), Z(1), \ldots, Z(M-1)\} \quad \text{[Equation 16]}$$

$$\{Z_R(0), Z_R(1), \ldots, Z_R(M-1)\} = \quad \text{[Equation 17]}$$
$$\{\text{Re}(Z(0)), \text{Re}(Z(1)), \ldots, \text{Re}(Z(M-1))\}$$

$$\{Z_I(0), Z_I(1), \ldots, Z_I(M-1)\} = \quad \text{[Equation 18]}$$
$$\{\text{Im}(Z(0)), \text{Im}(Z(1)), \ldots, \text{Im}(Z(M-1))\}$$

The IDCT unit 215 performs an IDCT operation for the real part symbol group generated by the complex number separating unit 213, and generates M IDCT symbols. The IDCT operation performed by the IDCT unit 215 may be given as Equation 19.

$$X_{IDCT}(m) = \sum_{k=0}^{M-1} \alpha(k) \cdot Z_R(k) \cdot \cos\left(\frac{\pi(2m+1)k}{2M}\right), \quad \text{[Equation 19]}$$

where $$m = 0, 1, \ldots, M-1$$

$$\alpha(0) = \sqrt{\frac{1}{M}}, \alpha(k) = \sqrt{\frac{2}{M}} \quad (1 \leq k \leq M-1)$$

The M IDCT symbols generated by the IDCT unit 215 will be referred to as an IDCT symbol group. The IDCT symbol group may be given as Equation 20.

$$\{X_{IDCT}(0), X_{IDCT}(1), \ldots, X_{IDCT}(M-1)\} \quad \text{[Equation 20]}$$

The IDST unit 217 performs an IDST operation for the imaginary part symbol group generated by the complex number separating unit 213, and generates M IDST symbols. The IDST operation performed by the IDST unit 217 may be given as Equation 21.

$$X_{IDST}(m) = \sum_{k=0}^{M-1} \alpha(k) \cdot Z_I(k) \cdot \sin\left(\frac{\pi(2m+1)k}{2M}\right), \quad \text{[Equation 21]}$$

where $$m = 0, 1, \ldots, M-1$$

$$\alpha(0) = \sqrt{\frac{1}{M}}, \alpha(k) = \sqrt{\frac{2}{M}} \quad (1 \leq k \leq M-1)$$

The M IDST symbols generated by the IDST unit 217 will be referred to as an IDST symbol group. The IDST symbol group may be given as Equation 22.

$$\{X_{IDST}(0), X_{IDST}(1), \ldots, X_{IDST}(M-1)\} \quad \text{[Equation 22]}$$

When the complex number combining unit 111 of the signal transmitting device 100 is driven according to Equation 9, the IDCT unit 215 performs the IDCT operation for the imaginary part symbol group generated by the complex number separating unit 213, and the IDST unit 217 performs the IDST operation for the real part symbol group generated by the complex number separating unit 213.

The complex number combining unit 219 combines the IDCT symbol group generated by the IDCT unit 215 and the IDST symbol group generated by the IDST unit 217 to generate M complex number symbols. The M complex number symbols generated by the complex number combining unit 219 will be referred to as a complex symbol group. The complex symbol group may be given as Equation 23.

$$\{X(0), X(1), \ldots, X(M-1)\} = \{X_{IDCT}(0) + jM_{IDST}(0), \ldots, \quad \text{[Equation 23]}$$
$$X_{IDCT}(M-1) + jM_{IDST}(M-1)\}$$

Also, the complex symbol group may be given as Equation 24.

$$\{X(0), X(1), \ldots, X(M-1)\} = \{X_{IDST}(0) + jM_{IDCT}(0), \ldots, \quad \text{[Equation 24]}$$
$$X_{IDST}(M-1) + jM_{IDCT}(M-1)\}$$

The PSC 221 serially outputs the complex symbol group input from the complex number combining unit 219 in parallel.

The digital demodulating unit 223 digitally demodulates the complex symbol group serially input from the PSC 221, and generates a final data signal that is binary data.

An orthogonal frequency division multiplexing access (OFDMA) signal transmitting device 300 according to the exemplary embodiment of the present invention will be described with reference to FIG. 4.

Figure 4:
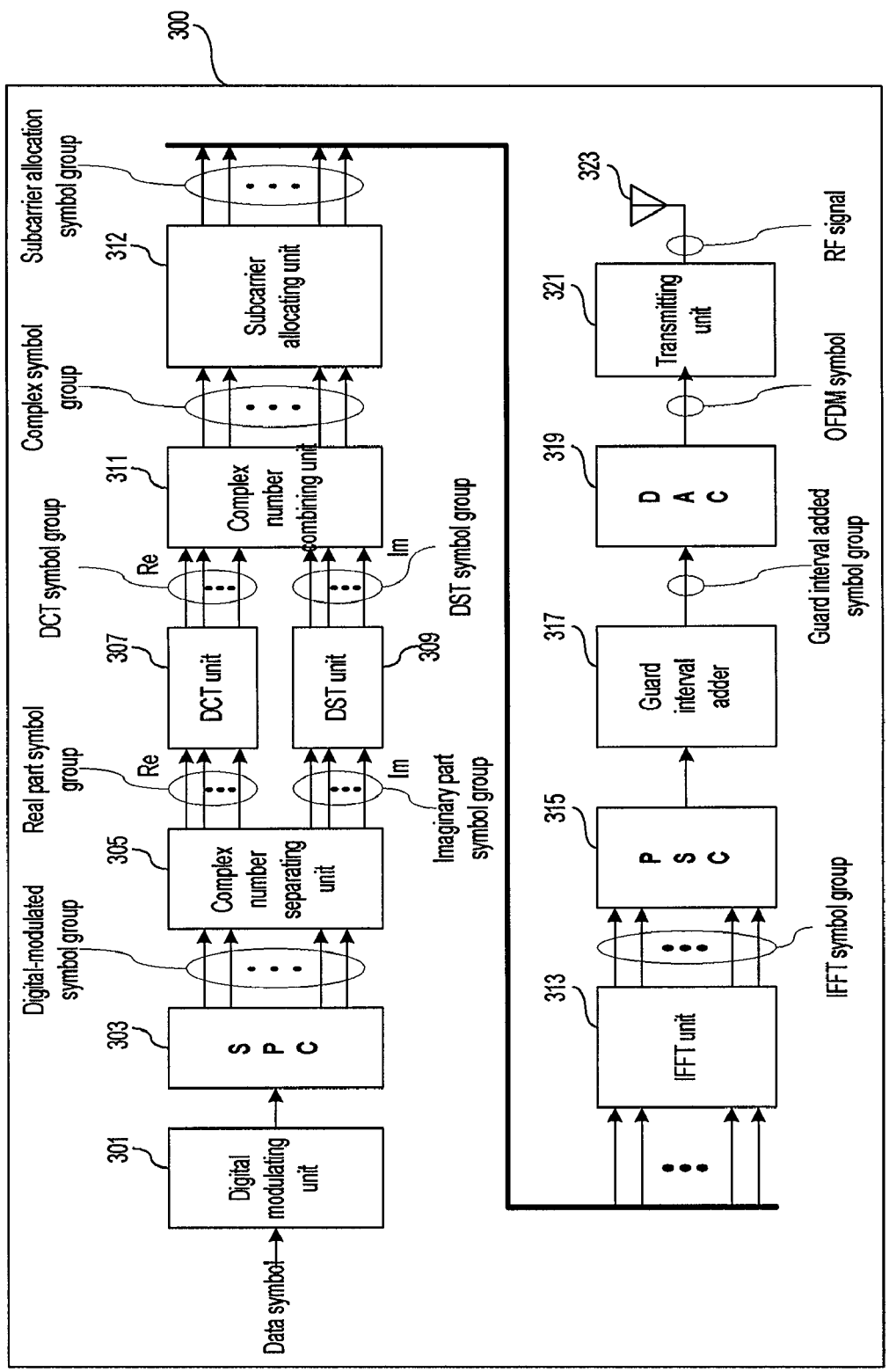
FIG. 4 shows a block diagram representing an OFDMA signal transmitting device according to the exemplary embodiment of the present invention.

FIG. 4 shows a block diagram representing the OFDMA signal transmitting device 300 according to the exemplary embodiment of the present invention.

As shown in FIG. 4, the OFDMA signal transmitting device 300 according to the exemplary embodiment of the present invention includes a digital modulating unit 301, an SPC 303, a complex number separating unit 305, a DCT unit 307, a DST unit 309, a complex number combining unit 311, a subcarrier allocating unit 312, an IFFT unit 313, a PSC 315, a guard interval adding unit 317, a DAC 319, a transmitting unit 321, and a transmitting antenna 323. Here, operations of the digital modulating unit 301, the SPC 303, the complex number separating unit 305, the DCT unit 307, the DST unit 309, the complex number combining unit 311, the PSC 315, the guard interval adding unit 317, the DAC 319, the transmitting unit 321, and the transmitting antenna 323 are similar to those of the signal transmitting device 100 shown in FIG. 2, and therefore detailed descriptions thereof will be omitted.

The subcarrier allocating unit 312 allocates a predetermined subcarrier group for each user to the complex symbol group generated by the complex number combining unit 311, and generates a subcarrier allocation symbol group. The IFFT unit 313 performs an IFFT operation for the complex symbol group according the allocated subcarrier group, and generates an IFFT symbol group. An operation of the subcarrier allocating unit 312 will be described with reference to FIG. 5.

Figure 5:
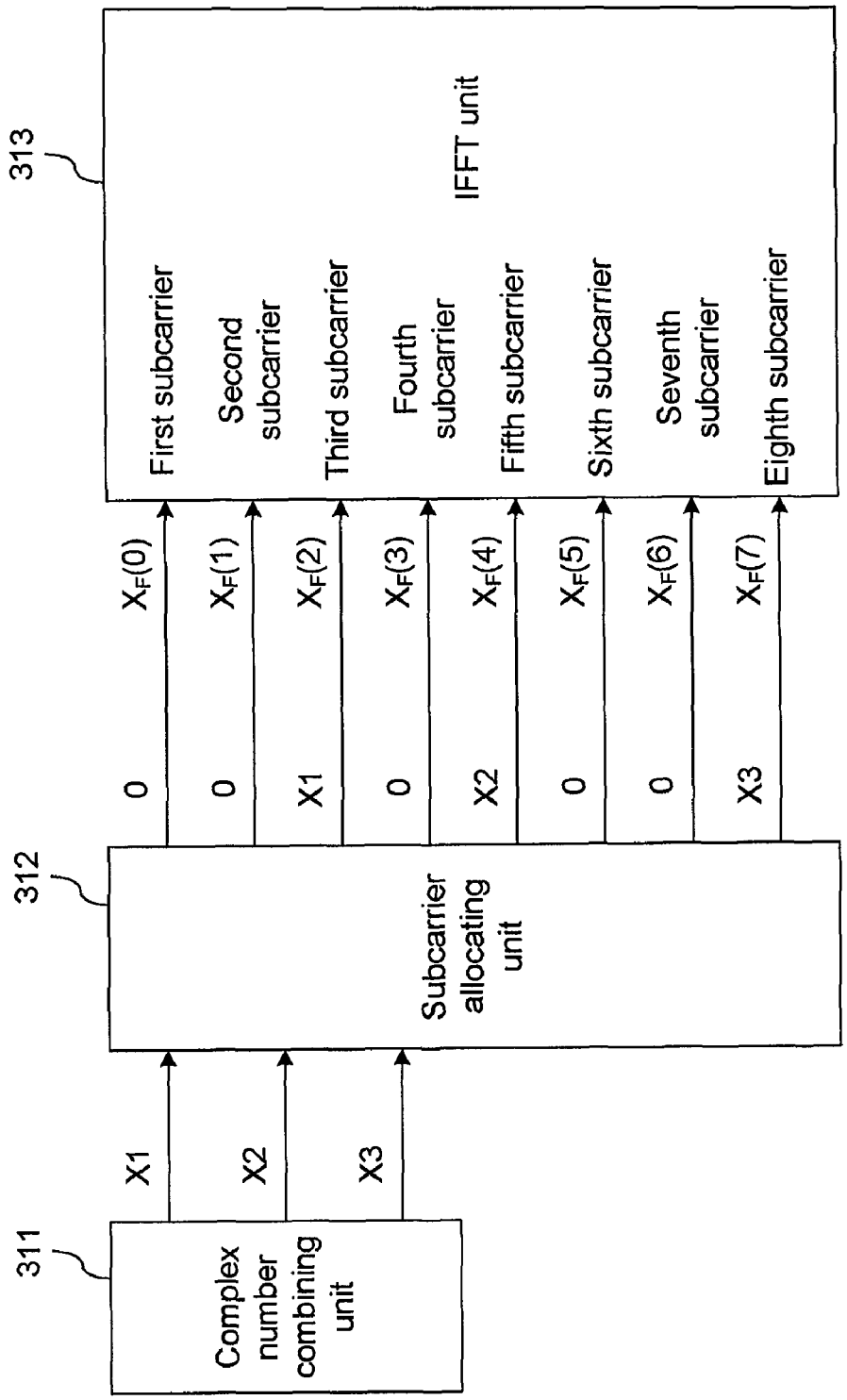
FIG. 5 shows a diagram representing an operation of a subcarrier allocating unit according to the exemplary embodiment of the present invention.

FIG. 5 shows a diagram representing the operation of the subcarrier allocating unit 312 according to the exemplary embodiment of the present invention.

Particularly, FIG. 5 shows a part of the signal transmitting device, in which one OFDM symbol includes 8 subcarriers. When a predetermined user uses a third subcarrier, a fifth subcarrier, and an eighth subcarrier, the subcarrier allocating unit 312 receives three complex number symbols X1, X2, and X3 from the complex number combining unit 311 in parallel, and outputs 8 complex number symbols 0, 0, X1, 0, X2, 0, 0, and X3 in parallel. In this case, the 8 complex number symbols 0, 0, X1, 0, X2, 0, 0, and X3 output from the subcarrier allocating unit 312 is the subcarrier allocation symbol group.

An OFDMA signal receiving device according to the exemplary embodiment of the present invention will be described with reference to FIG. 6.

Figure 6:
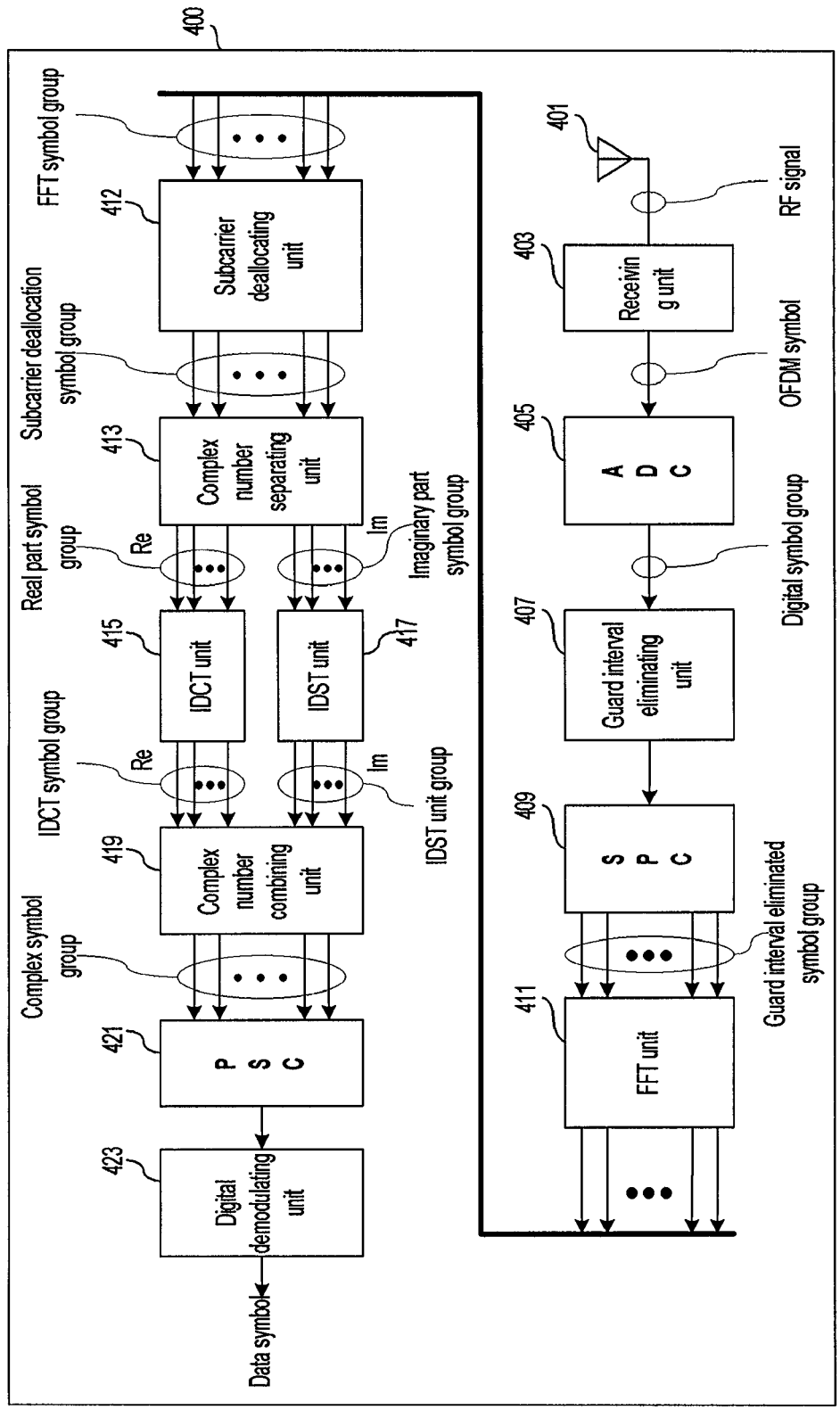
FIG. 6 shows a block diagram representing an OFDMA signal receiving device according to the exemplary embodiment of the present invention.

FIG. 6 shows a block diagram representing the OFDMA signal receiving device according to the exemplary embodiment of the present invention.

As shown in FIG. 6, the OFDMA signal receiving device 400 according to the exemplary embodiment of the present invention includes a receiving antenna 401, a receiving unit 403, an ADC 405, a guard interval eliminating unit 407, an SPC 409, an FFT unit 411, a subcarrier deallocating unit 412, a complex number separating unit 413, an IDCT unit 415, an IDST unit 417, a complex number combining unit 419, a PSC 421, and a digital demodulating unit 423. Here, operations of the receiving antenna 401, the receiving unit 403, the ADC 405, the guard interval eliminating unit 407, the SPC 409, the complex number separating unit 413, the IDCT unit 415, the IDST unit 417, the complex number combining unit 419, the PSC 421, and the digital demodulating unit 423 are similar to those of the signal receiving device 200 shown in FIG. 3, and therefore detailed descriptions thereof will be omitted.

The FFT unit 411 performs an FFT operation for the guard interval eliminated symbol group output from the SPC 409 in parallel, and generates N FFT symbols. The subcarrier deallocating unit 412 outputs symbols (hereinafter referred to as a "subcarrier deallocation symbol group") corresponding to subcarriers of the signal receiving device 400 among the N FFT symbols generated by the FFT unit 411. An operation of the subcarrier deallocating unit 412 will be described with reference to FIG. 7.

Figure 7:
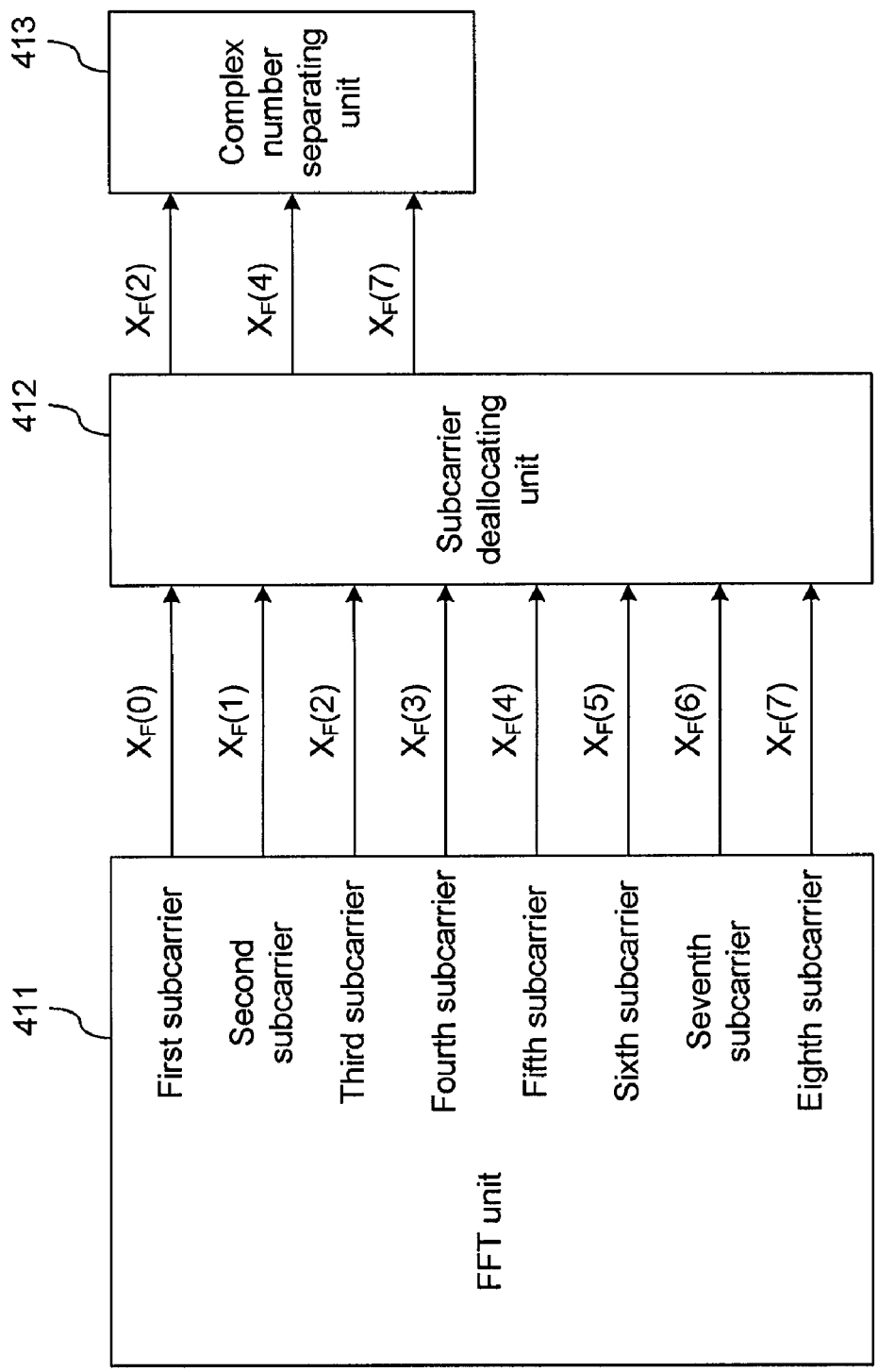
FIG. 7 shows a diagram representing a subcarrier deallocating unit according to the exemplary embodiment of the present invention.

FIG. 7 shows a diagram representing the subcarrier deallocating unit according to the exemplary embodiment of the present invention. Particularly, FIG. 7 shows a part of the signal receiving device, in which one OFDM symbol includes 8 subcarriers. When the signal receiving device 400 uses a third subcarrier, a fifth subcarrier, and an eighth subcarrier, the subcarrier deallocating unit 412 provides FFT symbols XF(2), XF(4), and XF(7) respectively corresponding to the third, fifth, and eighth subcarriers, to the complex number separating unit 413. Here, the three symbols XF(2), XF(4), and XF(7) output from the subcarrier deallocating unit 412 are the subcarrier deallocation symbol group.

A multiple input multiple output (MIMO)-OFDM signal transmitting device according to the exemplary embodiment of the present invention will be described with reference to FIG. 8.

Figure 8:
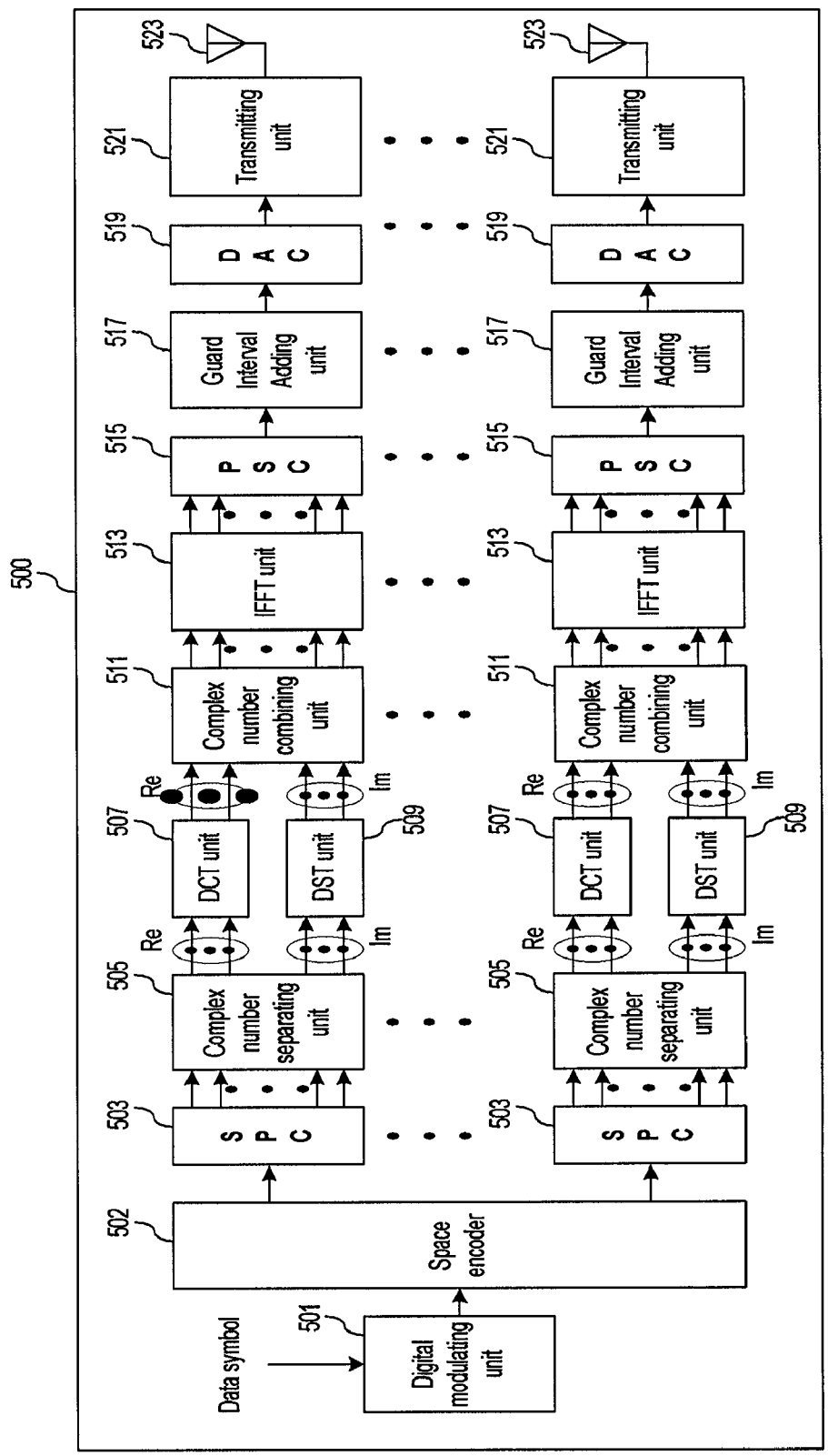
FIG. 8 shows a diagram representing an MIMO-OFDM signal transmitting device according to the exemplary embodiment of the present invention.

FIG. 8 shows a diagram representing the MIMO-OFDM signal transmitting device according to the exemplary embodiment of the present invention.

As shown in FIG. 8, the MIMO-OFDM signal transmitting device 500 according to the exemplary embodiment of the present invention includes a digital modulating unit 501, a space encoder 502, a plurality of SPCs 503, a plurality of complex number separating units 505, a plurality of DCT units 507, a plurality of DST units 509, a plurality of complex number combining units 511, an IFFT unit 513, a PSC 515, a guard interval adding unit 517, a DAC 519, a plurality of transmitting units 521, and a plurality of transmitting antennas 523.

The space encoder 502 receives a digital demodulated symbol from the digital modulating unit 501, and performs a space encoding operation, such as an Alamouti encoding operation, for a plurality of space areas, and generates a plurality of space encoded symbols respectively corresponding to the plurality of space areas.

The plurality of SPCs 503 respectively correspond to the plurality of space areas. In addition, the respective SPCs 503 serially receive the space encoded symbols corresponding to the corresponding space area, and output them in parallel. The plurality of space encoded symbols output from the respective SPCs 503 will be referred to as a space encoded symbol group.

The plurality of complex number separating units 505 respectively correspond to the plurality of space areas. In addition, the complex number separating units 505 receive the space encoded symbol group from the SPC 503 corresponding to the corresponding space area, separate a real part and an imaginary part from the space encoded symbol group, and output a real part symbol group and an imaginary part symbol group.

The plurality of DCT units 507 respectively correspond to the plurality of space areas. In addition, the respective DCT units 507 perform the DCT operation for the real part symbol group output from the complex number separating unit 505 corresponding to the corresponding space area, and generate a DCT symbol group.

The plurality of DST units 509 respectively correspond to the plurality of space areas. In addition, the respective DST units 509 perform the DST operation for the imaginary part symbol group output from the complex number separating unit 505 corresponding to the corresponding space area, and generate a DST symbol group.

In this case, as described above, the respective DOT units 507 may perform the DCT operation for the imaginary part symbol group, and the respective DST units 509 may perform the DST operation for the real part symbol group.

The plurality of complex number combining units 511 respectively correspond to the plurality of space areas. In addition, the respective complex number combining units 511 combine the DCT symbol group output from the DCT unit 507 corresponding to the corresponding space area and the DST symbol group output from the DST unit 509 corresponding to the corresponding space area, and generate a complex symbol group.

The plurality of IFFT units 513 respectively correspond to the plurality of space areas. In addition, the respective IFFT units 513 perform the IFFT operation for the complex symbol group generated by the complex number combining unit 511 corresponding to the corresponding space area, and generate an IFFT symbol group.

The plurality of PSCs 515 respectively correspond to the plurality of space areas. In addition, the respective PSCs 515 serially output the parallel IFFT symbol group output from the IFFT unit 513 corresponding to the corresponding space area.

The plurality of guard interval adding units 517 respectively correspond to the plurality of space areas. In addition, the respective guard interval adding units 517 add the guard interval to the IFFT symbol group serially output from the PSC 515 corresponding to the corresponding space area.

A plurality of DACs 519 respectively correspond to the plurality of space areas. In addition, the respective DACs 519 convert the guard interval added IFFT symbol group into an analog signal, and generate an OFDM symbol.

The plurality of transmitting units 521 respectively correspond to the plurality of space areas. In addition, the plurality of transmitting antennas 523 respectively correspond to the plurality of space areas. The respective transmitting units 521 receive the OFDM symbol from the DAC 519 corresponding to a corresponding space area, amplify it to an RF signal, and transmit the RF signal to a channel through transmitting antenna 523 corresponding to the corresponding space area.

An MIMO-OFDM signal receiving device according to the exemplary embodiment of the present invention will be described with reference to FIG. 9.

Figure 9:
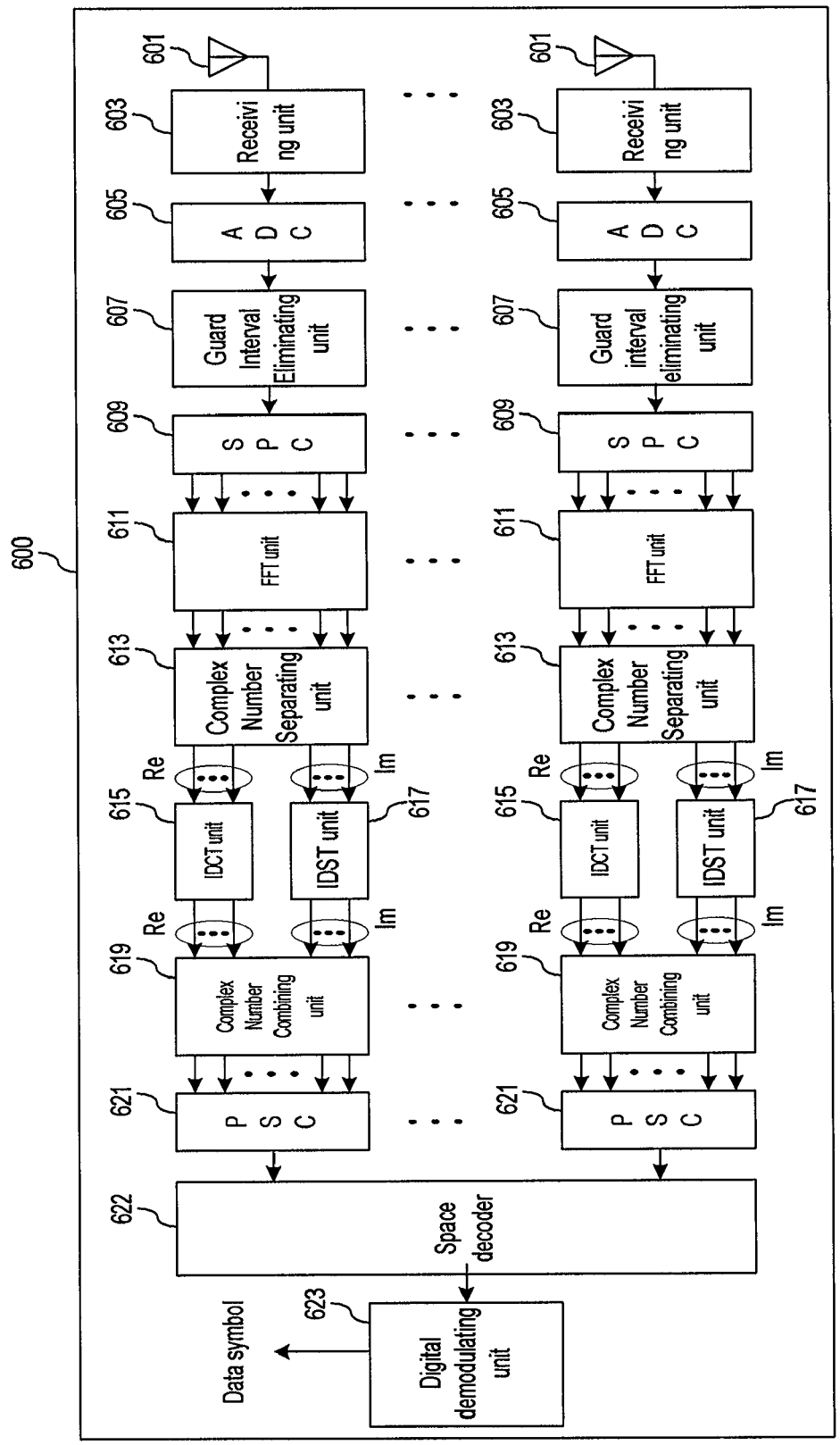
FIG. 9 shows a block diagram representing an MIMO-OFDM signal receiving device according to the exemplary embodiment of the present invention.

FIG. 9 shows a block diagram representing an MIMO-OFDM signal receiving device according to the exemplary embodiment of the present invention.

As shown in FIG. 9, the MIMO-OFDM signal receiving device 600 according to the exemplary embodiment of the present invention includes a plurality of receiving antennas 601, a plurality of receiving units 603, a plurality of ADCs 605, a plurality of guard interval eliminating units 607, a plurality of SPCs 609, a plurality of FFT units 611, a plurality of complex number separating units 613, a plurality of IDCT units 615, a plurality of IDST units 617, a plurality of complex number combining units 619, a plurality of PSCs 621, a space decoder 622, and a digital demodulating unit 623.

The plurality of receiving antennas 601 respectively correspond to the plurality of space areas.

The plurality of receiving units 603 respectively correspond to the plurality of space areas. The respective receiving units 603 receive the OFDM symbol from the receiving antenna 601 corresponding to the corresponding space area.

The plurality of ADCs 605 respectively correspond to the plurality of space areas. The respective ADCs 605 convert the received OFDM symbol into a digital signal, and generate a digital symbol group.

The plurality of guard interval eliminating units 607 respectively correspond to the plurality of space areas. The respective guard interval eliminating units 607 eliminate a guard interval from the digital symbol group generated by the ADC 605 corresponding to the corresponding space area.

The plurality of SPCs 609 respectively correspond to the plurality of space areas. The respective SPCs 609 serially receive the guard interval eliminated digital symbol group from the guard interval eliminating unit 607 corresponding to the corresponding space area, and output the serial guard interval eliminated digital symbol group in parallel.

The plurality of FFT units 611 respectively correspond to the plurality of space areas. The respective FFT units 611 perform the FFT operation for the digital symbol group output in parallel from the SPC 609 corresponding to the corresponding space, and generate an FFT symbol group.

The plurality of complex number separating units 613 respectively correspond to the plurality of space areas. The respective complex number separating units 613 separate the FFT symbol group, which is generated by the FFT unit 611 corresponding to the corresponding space area, into a real part and an imaginary part, and generate a real part symbol group and an imaginary part symbol group.

The plurality of IDCT units 615 respectively correspond to the plurality of space areas. The respective IDCT units 615 receive the real part symbol group from the complex number separating unit 613 corresponding to the corresponding space area, perform IDCT operation, and generate an IDCT symbol group.

The plurality of IDST units 617 respectively correspond to the plurality of space areas. The respective IDST units 617 receive the imaginary part symbol group from the complex number separating unit 613 corresponding to the corresponding space area, perform the IDST operation, and generate an IDST symbol group.

In this case, as described above, the respective IDCT units 615 may perform the IDCT operation for the imaginary part symbol group and the respective IDST units 617 may perform the IDST operation for the real part symbol group.

The plurality of complex number combining units 619 respectively correspond to the plurality of space areas. The respective complex number combining units 619 combine the IDCT symbol group output from the IDCT unit 615 corresponding to the corresponding space area and the IDST symbol group output from the IDST unit 617 corresponding to the corresponding space area, and output a complex symbol group.

The plurality of PSCs 621 respectively correspond to the plurality of space areas. The respective PSCs 621 receive the complex symbol group in parallel from the complex number combining unit 619 corresponding to the corresponding space area, and serially output the complex symbol group.

The space decoder 622 receives the complex symbol group from the plurality of PSCs 621, and performs a space decoding operation for the plurality of space areas. Signals output from the space decoder 622 will be referred to as a space decoded signal group. Digital modulation operations including BPSK and QAM are performed for the space decoded signal group.

The digital demodulating unit 623 digitally demodulates the space decoded signal group received from the space decoder 622, and outputs a final data signal.

The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A device for generating an orthogonal frequency division multiplexing (OFDM) symbol, the device comprising:
    a complex number separating unit for separating a plurality of digital-modulated symbols as a real part symbol group and an imaginary part symbol group;
    a discrete cosine transform (DCT) unit for performing a DCT operation of the real part symbol group, and generating a DCT symbol group;
    a discrete sine transform (DST) unit for performing a DST operation for the imaginary part symbol group, and generating a DST symbol group;
    a complex number combining unit, coupled to outputs of the DCT and DST units, for combining the DCT symbol group and the DST symbol group respectively generated by the DCT and DST units, and outputting a complex symbol group;
    an inverse fast Fourier transform (IFFT) unit, coupled to an output of the complex number combining unit, for performing an IFFT operation for the complex symbol group output by the complex number combining unit, and generating an IFFT symbol group; and
    an analog converter for converting the IFFT symbol group generated by the IFFT unit into an analog signal, and generating the OFDM symbol.

2. The device of claim 1, further comprising a subcarrier allocating unit for allocating a subcarrier group for each user to the complex symbol group, wherein the IFFT unit receives the complex symbol group and performs the IFFT operation according to the subcarrier group.

3. The device of claim 1, further comprising a guard interval adding unit for adding a guard interval for preventing inter-symbol interference (ISI) to the IFFT symbol group, and generating a guard interval added symbol group, wherein the analog converter uses the guard interval added symbol group to generate the OFDM symbol.

4. The device of claim 1, further comprising a digital modulating unit for digitally modulating a binary data symbol to generate the digital-modulated symbol.

5. A device for generating an orthogonal frequency division multiplexing (OFDM) symbol, the device comprising:
    a complex number separating unit for separating a plurality of digital-modulated symbols as a real part symbol group and an imaginary part symbol group;
    a discrete cosine transform (DCT) unit for performing a DCT operation for the imaginary part symbol group, and generating a DCT symbol group;
    a discrete sine transform (DST) unit for performing a DST operation for the real part symbol group, and generating a DST symbol group;
    a complex number combining unit, coupled to outputs of the DCT and DST units, for combining the DCT symbol group and the DST symbol group respectively generated by the DCT and DST units, and outputting a complex symbol group;
    an inverse fast Fourier transform (IFFT) unit, coupled to an output of the complex number combining unit, for performing an IFFT operation for the complex symbol group output by the complex number combining unit, and generating an IFFT symbol group; and
    an analog converter for converting the IFFT symbol group generated by the IFFT unit into an analog signal, and generating the OFDM symbol.

6. A signal transmitting device for transmitting a binary data symbol to a channel, the signal transmitting device comprising:
    a plurality of antennas corresponding to a plurality of space areas;
    a digital modulating unit for digitally modulating the binary data symbol, and generating a digital-modulated symbol;
    a space encoder for receiving the digital-modulated symbol, performing a space encoding operation for the plurality of space areas, and generating a plurality of space encoded symbols respectively corresponding to the plurality of space areas;
    a plurality of complex number separating units respectively corresponding to the plurality of space areas, receiving the plurality of space encoded symbols corresponding to the corresponding space areas, separating the received space encoded symbols as a real part and an imaginary part, and outputting a real part symbol group and an imaginary part symbol group;
    a plurality of discrete cosine transform (DCT) units respectively corresponding to the plurality of space areas, performing a DCT operation for the real part symbol group output from the complex number separating unit corresponding to the corresponding space area, and generating a DCT symbol group;
    a plurality of discrete sine transform (DST) units respectively corresponding to the plurality of space areas, performing a DST operation for the imaginary part symbol group output from the complex number separating unit corresponding to the corresponding space area, and generating a DST symbol group;
    a plurality of complex number combining units respectively corresponding to the plurality of space areas, combining the DCT symbol group output from the DCT unit corresponding to a corresponding space area and the DST symbol group output from the corresponding DST unit, and generating a complex symbol group;
    a plurality of inverse fast Fourier transform (IFFT) units respectively corresponding to the plurality of space areas, performing an IFFT operation for the complex symbol group output from the complex number combining unit corresponding to the corresponding space area, and generating an IFFT symbol group;
    an analog converter respectively corresponding to the plurality of space areas, converting the IFFT symbol group, which is output from the IFFT unit corresponding to the corresponding space area, into an analog signal, and generating an orthogonal frequency division multiplexing (OFDM) symbol; and a plurality of transmitting units respectively corresponding to the plurality of space areas, and transmitting the OFDM symbol, which is output from the analog converter corresponding to the corresponding space area, to the channel through the antenna corresponding to the corresponding space area.

7. The signal transmitting device of claim 6, further comprising a plurality of guard interval adding units respectively corresponding to the plurality of space areas, adding a guard interval for preventing an inter-symbol interference (ISI) to the IFFT symbol group output from the IFFT unit corresponding to the corresponding space area, and generating a guard interval added symbol group, wherein the plurality of analog converters convert the guard interval added symbol group, which is output from the guard interval adding unit corresponding to the corresponding space area, into an analog signal.

8. A signal transmitting device for transmitting a binary data symbol to a channel, the signal transmitting device comprising:

a plurality of antennas respectively corresponding to a plurality of space areas;

a digital modulating unit for digitally modulating the binary data symbol, and generating a digital-modulated symbol;

a space encoder for receiving the digital-modulated symbol, performing a space encoding operation for the plurality of space areas, and generating a plurality of space encoded symbols respectively corresponding to the plurality of space areas;

a plurality of complex number separating units respectively corresponding to the plurality of space areas, receiving the plurality of space encoded symbols corresponding to the corresponding space areas, separating the space encoded symbols as a real part and an imaginary part, and outputting a real part symbol group and an imaginary part symbol group;

a plurality of discrete cosine transform (DCT) units respectively corresponding to the plurality of space areas, performing a DCT operation for the imaginary part symbol group output from the complex number separating unit corresponding to the corresponding space area, and generating a DCT symbol group;

a plurality of discrete sine transform (DST) units respectively corresponding to the plurality of space areas, performing a DST operation for the real part symbol group output from the complex number separating unit corresponding to the corresponding space area, and generating a DST symbol group;

a plurality of complex number combining units respectively corresponding to the plurality of space areas, combining the DCT symbol group output from the DCT unit corresponding to the corresponding space area and the DST symbol group output from the corresponding DST unit, and outputting a complex symbol group;

a plurality of inverse fast Fourier transform (IFFT) units respectively corresponding to the plurality of space areas, performing an IFFT operation for the complex symbol group output from the complex number combining unit corresponding to the corresponding space area, and generating an IFFT symbol group;

a plurality of analog converters respectively corresponding to the plurality of space areas, converting the IFFT symbol group, which is output from the IFFT unit corresponding to the corresponding space area, into an analog signal, and generating an orthogonal frequency division multiplexing (OFDM) symbol; and a plurality of transmitting units respectively corresponding to the plurality of space areas, and transmitting the OFDM symbol, which is output from the analog converter corresponding to the corresponding space area, to the channel through the antenna corresponding to the corresponding space.

* * * * *